United States Patent [19]
Arai et al.

[11] Patent Number: 5,341,152
[45] Date of Patent: Aug. 23, 1994

[54] INPUT DEVICE FOR CAD

[75] Inventors: Ryuji Arai, Sapporo; Toru Eshita, Tokyo; Kaoru Niimi, Tokyo; Tatsuyoshi Ikuta, Tokyo; Hiroyuki Furuichi, Tokyo; Tetsuya Iwanaga, Tokyo, all of Japan

[73] Assignee: Mutoh Industries Ltd., Tokyo, Japan

[21] Appl. No.: 737,124

[22] Filed: Jul. 30, 1991

[30] Foreign Application Priority Data

Sep. 26, 1990 [JP] Japan ................... 2-256538

[51] Int. Cl.⁵ ........................................ G09G 1/06
[52] U.S. Cl. .................................. 345/133; 345/157; 345/179
[58] Field of Search .............. 340/706, 709, 712, 723; 395/133, 139, 142, 156; 345/156, 157, 169, 160–163, 173, 179, 121, 127

[56] References Cited

U.S. PATENT DOCUMENTS

| | | | |
|---|---|---|---|
| 4,388,620 | 6/1983 | Sherman | 395/141 |
| 4,622,641 | 11/1986 | Stephens | 340/709 |
| 4,698,625 | 10/1987 | McCaskill et al. | 340/723 |
| 4,835,722 | 5/1989 | Clarke et al. | 395/142 |
| 4,905,166 | 2/1990 | Schuerman | 395/142 |
| 4,947,156 | 8/1990 | Sato et al. | 340/706 |
| 5,040,131 | 8/1991 | Torres | 395/156 |

*Primary Examiner*—Ulysses Weldon
*Assistant Examiner*—Gin Goon
*Attorney, Agent, or Firm*—Sughrue, Mion, Zinn, Macpeak & Seas

[57] ABSTRACT

Under a transparent board-like digitizer, a screen of the same size as that of the digitizer is positioned. Scenes of a display device is shown on the screen. A co-ordinates standard of the digitizer is set to be identical with that of the screen. Consequently, the point indicated on the digitizer of a first cursor device is shown at a position corresponding to that of the point indicated by means of the cursor. In a circle drawing mode of the digitizer, when the operator places the cursor device on the digitizer and co-ordinates data are inputted to a computer, a plot circle corresponding to the co-ordinates data is displayed on the screen. When the operator makes the plot circle by means of the cursor device, the computer selects a radial input system. On the other hand, when the operator uses the cursor device and selects the exterior of the plot circle, a transient point input system is selected. In an operation of the radial input system, the operator uses a key board or a command menu displayed on the screen in order to carry out an input operation. When the operator inputs a radial r to the computer, a circle with its radial r and its center corresponding to the center of the plot circle is drawn or displayed on the screen. In the transient point input system of the input device, when the operator hits any point on the digitizer by means of the cursor device, a circle having its center corresponding to the center of the plot circle and having its line passing on the point the cursor device hits is drawn.

7 Claims, 9 Drawing Sheets

INPUT DEVICE FOR CAD

BACKGROUND OF THE INVENTION

The present invention relates to a drawing co-ordinates input device adapted to be used for a computer-aided-designing and drafting system or CAD.

Patent Publication No. 62-59329 describes a conventional co-ordinates input device constructed by assembling a position detection tablet or a digitizer and a display device so as to display or indicate patterns on the display device. When the co-ordinates input device, including integrally as described above the digitizer and the display device, is used as an input device to the CAD apparatus or system, circle drafting commands are appointed on a command menu displayed on the display device in order to draw patterns.

A number of commands are compactly arranged in a small area of the command menu column shown on the display device, making the operation of the command menu and the display device very difficult.

It is the purpose of the present invention to solve the problem above of the conventional input device for CAD.

SUMMARY OF THE INVENTION

An input device for CAD comprises a plot circle drafting means for displaying a plot circle having its center point of a first co-ordinates indication data generated by placing the cursor device of the digitizer on the screen of the display device, a plot circle data table for storing co-ordinates data of the plot circle, a co-ordinates comparison means for determining whether the second co-ordinates indication data generated by placing the cursor device on the digitizer is out of or within the plot circle from the second co-ordinates data and the data of the plot circle data table, a radius input circle drafting means for outputting data of a circle provided with its center of the center of the plot circle and its radius of the input radius data r to the data base when the selection of the co-ordinates comparison means is carried out and the radius data r is inputted, a drawing means of a circle due to a passing point indication for outputting data of a circle passing through a passing point data P and provided with its center of the center of the plot circle to the data base when the passing point data P is inputted, and a screen display means for reading-out data of a circle of the data base in order to display it on the screen or display of the display device. The input device for CAD is adapted to be used in an apparatus for drafting patterns on a screen of a display device by taking the screen or display of the display device on a drafting board like digitizer, making an indication position of a cursor device on the digitizer agree with another indication position on the screen of the display device, and putting a position signal into a control apparatus through the display device. In operation of a circle drafting mode of the input device for CAD, when an operator indicates a center point on the digitizer, a plot circle provided with its center point of the center point above is formed and displayed on the digitizer. When the cursor device is placed within the plot circle, the mode of the input device changes to a radius input mode. When it hits out of the plot circle, the mode of the input device changes to a passing point indication one. When the mode is of the radius input mode and the cursor device is placed out of the plot circle, the mode changes to a passing point indication mode. When the mode is of the radius input one and a radius data is inputted to the radius input circle drafting means, a circle provided with its radius of the input radius data and its center of the center of the plot circle is displayed on the display device. When the mode is of a passing point indication one and any passing point P on the tablet is hit by the cursor device, a circle having its center of the center of the plot circle and passing through the point P is displayed on the display device.

DESCRIPTION OF THE PREFERRED EMBODIMENT

The structure of the present invention will be described in detail with reference to its embodiment shown in the accompanying drawings.

Figure 5:
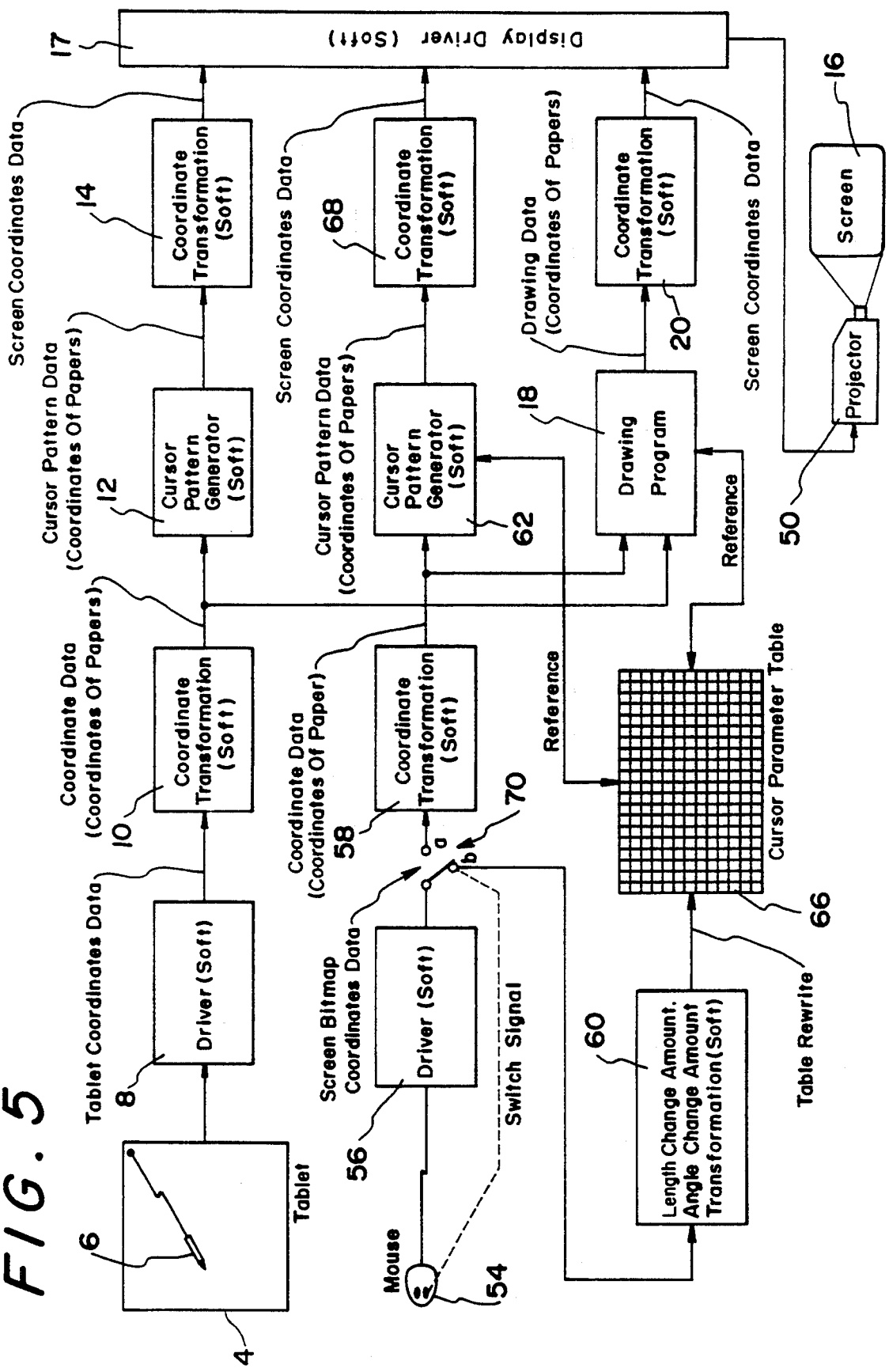
FIG. 5 is a block diagram of CAD.
Figure 6:
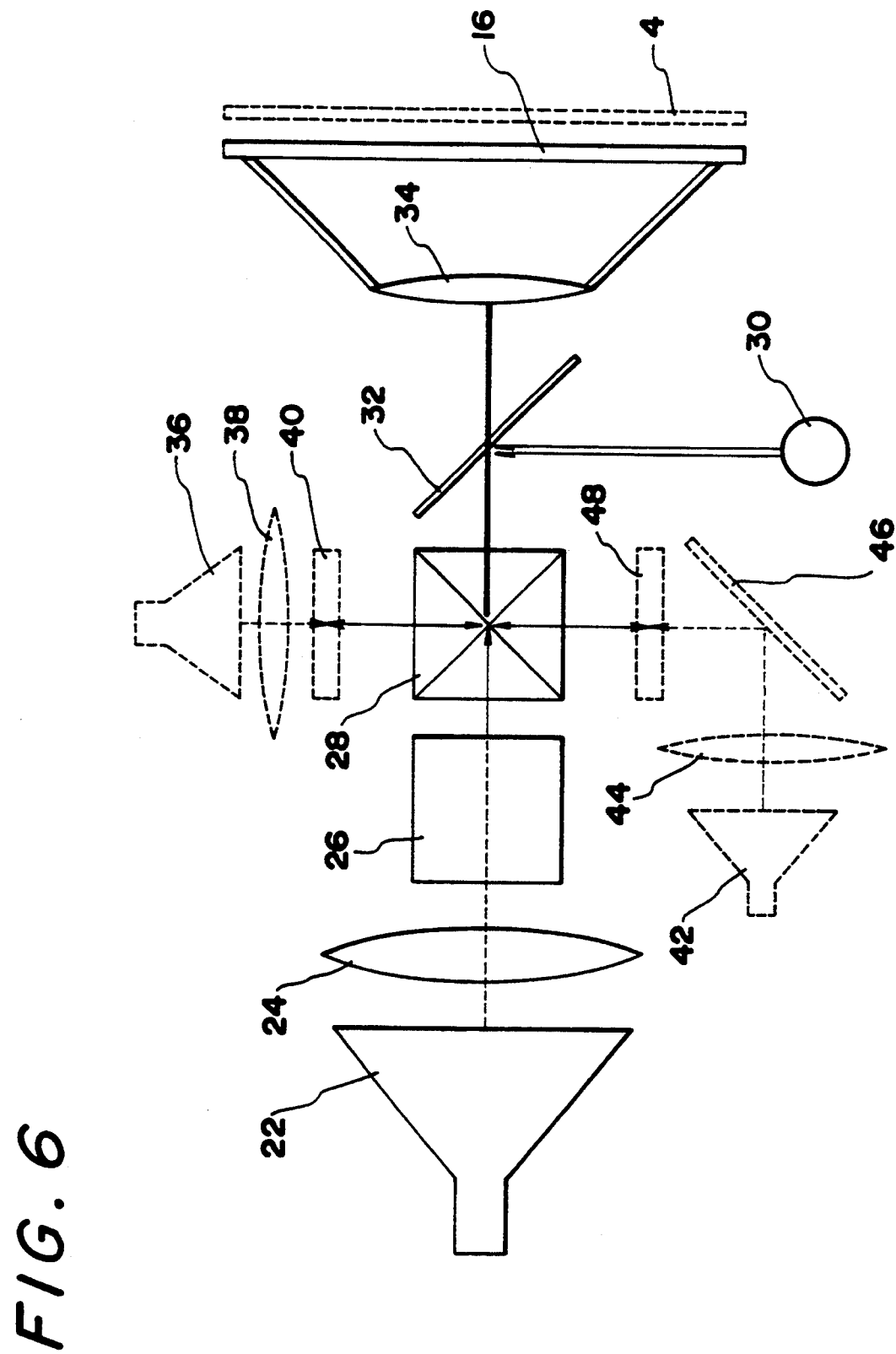
FIG. 6 is an explanation view.
Figure 9:
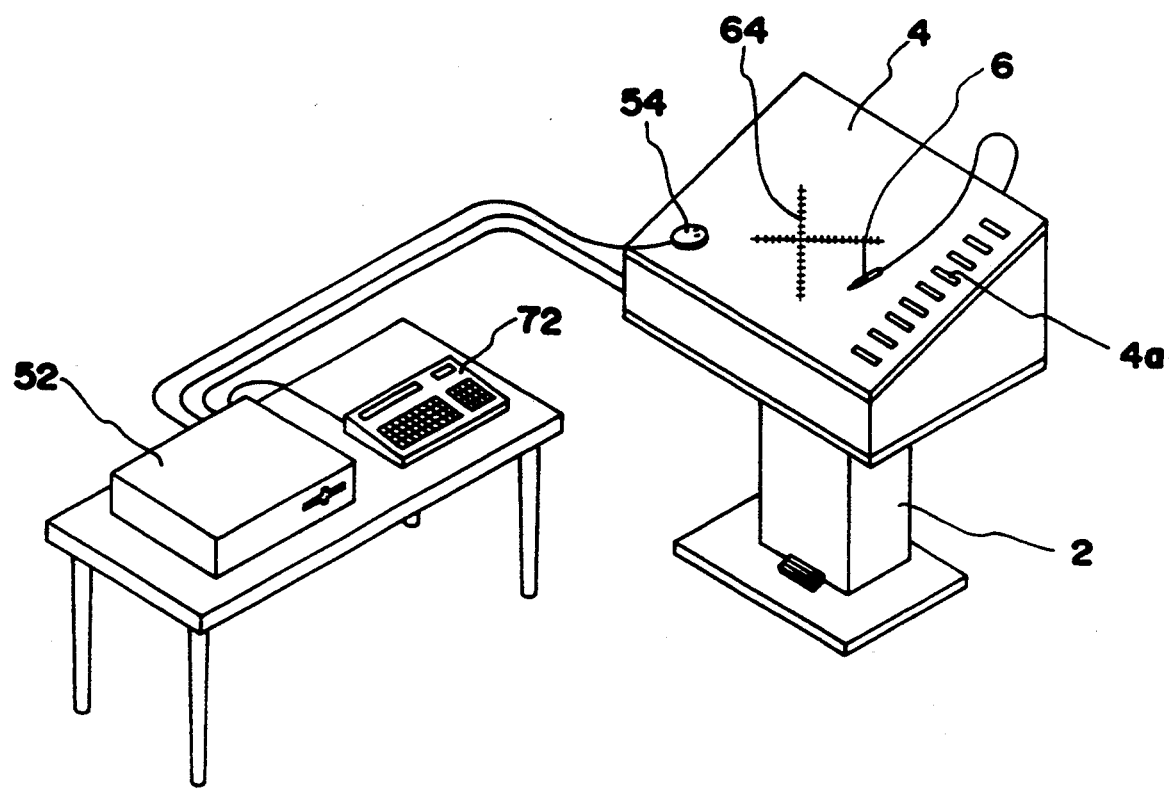
FIG. 9 is a perspective view of whole construction of the input device according to the present invention.

As shown in FIG. 9, a drafting desk 2 has a supporting frame and a transparent tablet type digitizer 4 is supported on the frame. The digitizer 4 is set to have the same size as that of an ordinal drafting board and has a flat face of, such as the drafting board. According to the digitizer 4, when an absolute type cursor device 6, such as a stylus pen, connected to a control apparatus (not shown) of the digitizer 4 is used by an operator to indicate a point on the digitizer 4, an absolute co-ordinates signal of the point indicated is translated to paper co-ordinates data through a driver 8 and a co-ordinates translation means 10 shown in FIG. 5. The translated data is supplied to a cursor pattern generator 12. The paper co-ordinates data means real data plane co-ordinates used as a standard of a drafting program. The cursor pattern generator 12 supplies cursor pattern data to a co-ordinates translation means 14. The co-ordinates translation means 14 translates cursor pattern data to display co-ordinates data and supplies them to a display driver 17, so that a cursor 15 corresponding to the indication position situated on the digitizer 4 of the cursor device 6 is displayed on the screen of the display device and the cursor 15 (see FIG. 5) is displayed or indicated on a screen 16 (see FIG. 5) through a projector 50. When a front end of the cursor device 6 comes in contact with the surface of the digitizer 4, the positional co-ordinates data of the cursor device 6 is supplied to a drafting program means 18. Consequently, the drafting program means 18 outputs drafting data according to drafting command position signal indicated or selected previously by the cursor device 6 from a command menu. The drafting data is translated into the display co-ordinates data by means of a co-ordinates translation means 20 and the data is supplied to the display driver 17, so that a pattern according to the drafting program is displayed. The drafting command can be called out by indicating a command menu region 4a (see FIG. 9) of the digitizer 4. The screen 16 is set as to have substantially the same size as that of the digitizer 4 and situated near the rear face of the digitizer 4. As shown in FIG. 6, a display device 22 consists of a cathode ray tube of green color, and a lens 24, a light valve 26, and a polarized prism 28 are arranged in front of the display device 22.

The light valve 26 translates images entered from one side of the valve 26 into clear images and shines the clear images to its other side. The construction and principle of the light valve 26 are disclosed in U.S. Pat. No. 3,723,651 and No. 4,343,535, so there is no detailed description of the valve will be omitted. A co-operative operation of the light valve 26 and the input of a xenon lamp 30 translates the image of the display device 22 into a clear image, thus the clear image is shone to the polarized prism 28. The image shone to the polarized prism 28 is enlarged and projected on the screen 16 through a half mirror 32 and a lens 34. A display device 36 consists of a cathode ray tube for red color, a lens 38 and a light valve 40 are arranged in front of a screen face of the display device 36. The light valve 40 faces the polarized prism 28. A display device 42 consists of a cathode ray tube for blue color, and a lens 44, a reflection mirror 46, and a light valve 48 are situated in front of the screen of the display device 42. The lightvalve 48 faces the polarized prism 24. These lenses 28, 48, 44 light valve 26, 38, 48, lamp 30, polarized prism 28, half mirror 32, and reflection mirror 46 construct a reflection type enlarging projection mechanism or projector for enlarging projecting an image on the screens of the display devices 22, 36, 42 on the screen 16. An enlarging rate of the enlarging projection mechanism is determined so as to make the position of the cursor device 6 which is indicated on the digitizer 4 and the position of the cursor 15 which is shown on the screen 16 fixed by the co-ordinates signal of the previous position agree. The screen 16 and the projector 50 are contained in the box or console of the drafting stand 2. The digitizer 4 and these display devices 22, 36, and 42, respectively are connected to a control apparatus 52 consisting of a host CPU. A cursor device 54 is an increment type having a mouse and outputting movement distance, and connected to a driver 56.

Figure 7:
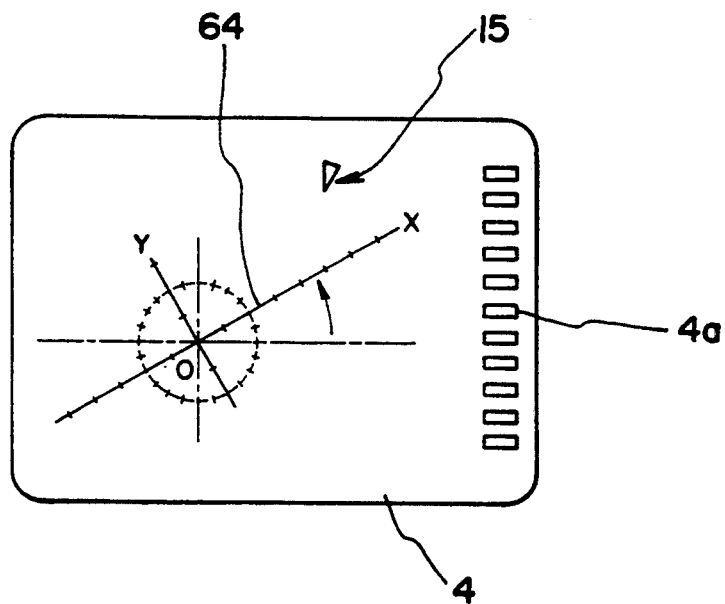
FIG. 7 is another explanatory view.
Figure 8:
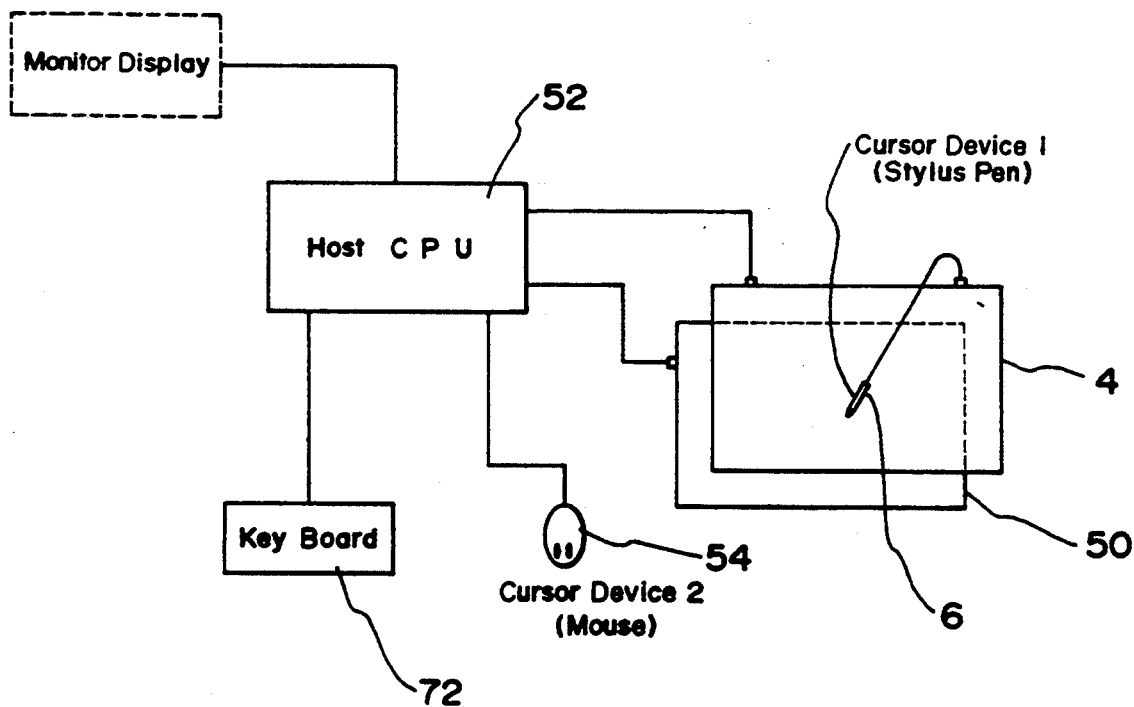
FIG. 8 is a block diagram of the CAD system.

The driver 56 is connected to a changed length value-changed-angle value translation means 60 and a co-ordinates translation means 58 through a pair of switch contacts a, b. Changing-over of the switch contacts a and b can be done by operating a switch key of the cursor device 54. A cursor pattern generator 62 indicates right angle scale lines 64 having the gradation as shown in FIG. 7. The right angle scale lines 64 are adapted to change the angle according to a content of a cursor parameter table 66. The cursor pattern generator 62 is connected to a display driver 17 through a co-ordinates change means 68. Reference numeral 72 is a key board. The cursor pattern parameter table contains therein various data of positional co-ordinates, angle of the origin or cross point of the right angle scale lines 64, X-axis length and Y-axis length of line pattern, and graduation width.

An operation of the system described above will be described.

Figure 10:
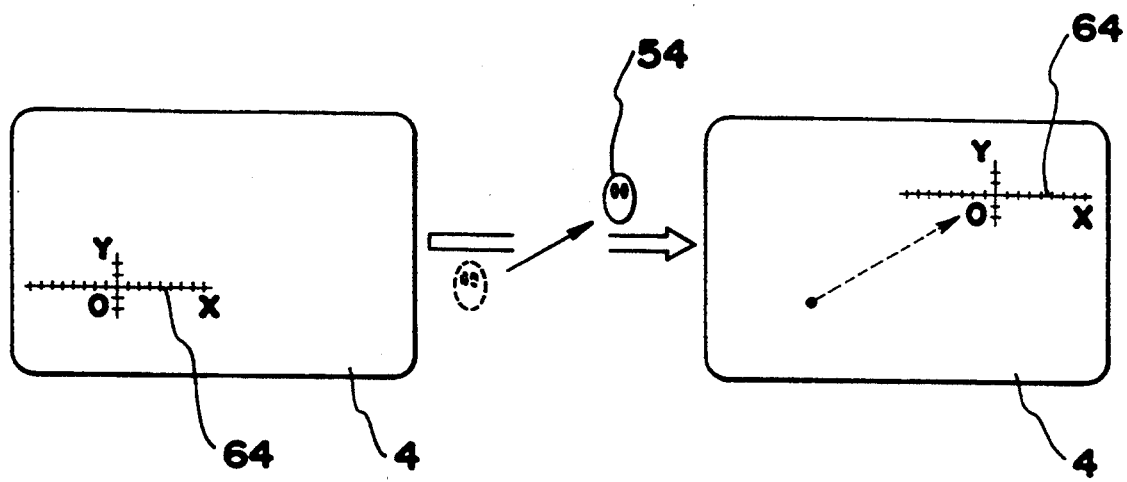
FIG. 10 is an explanation of the operation.
Figure 11:
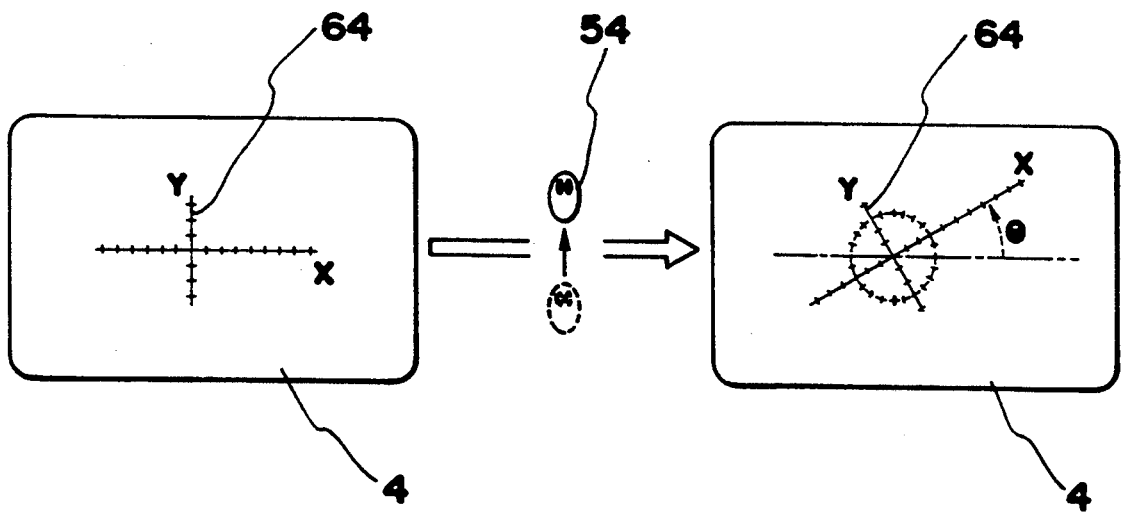
FIG. 11 is another explanation similar to FIG. 10.

A right-angle scale line 64 which is displayed on the screen 16 can be operated by the cursor device 54. When no key of the cursor device 54 is pressed, the switch 70 is kept connected to the contact (a). When the cursor device 54 is moved along a XY direction on the digitizer 4 or other table's plane face, output change values of $\Delta x$ and $\Delta y$ of the cursor device 54 are translated as they are into a parallel movement of the origin position of the right angle scale lines 64 and is indicated as shown in FIG. 10. When the mouse key of the cursor device 54 is pressed, the switch 70 connects with contact. When the cursor device 54 is moved along the XY direction on the table plane face while pressing the mouse key, the change or translation means 60 picks up length change value of $\Delta y$ or $\Delta x$ of the cursor device 54 in order to change linearly these change values of $\Delta y$ or $\Delta x$ to an angle $\Delta \theta$ using a function $f(\Delta y)$. The angle change value $\Delta \theta$ is added to the angle $\theta$ at present on parameter table 66. The cursor pattern generator 62 rotates the right angle scale lines 64 by a volume for the angle $\theta$ according to the content of the parameter table 66 and it is indicated on the screen 16 as shown in FIG. 11. The angle $\theta$ of the right angle scale line 64 is shown on the screen 16 by the drafting programming means 18. While, the operator indicates a command region 4a on the digitizer 4 by the front end of the cursor device 6 to order, for example, a green straight line command to the drafting program means 18 of the control apparatus 52 indicating two points A and B on the digitizer 4 through the front end of the cursor device 6, consequently drafting coordinates signal of the two points A and B is inputted into the drafting program means 18. The control apparatus 52 makes a drafting data on the basis of the inputted co-ordinates signal and the drafting data is translated Into a display co-ordinates data through the co-ordinates change means 20, controlling the display apparatus 22 on the basis of the co-ordinates data. Consequently, a straight line AB is shown on the screen of the display device 22 on the basis of XY co-ordinates axes (screen co-ordinates) of the image face. The image on the screen of the display device 22 is projected toward the polarized prism 28 through the light valve 26, and the image on the screen is enlarged and projected on the screen 16 through the polarized prism 28, the half mirror 32, and the lens 34. Both the origin points of the XY co-ordinates standards of this enlarged projected image and of the digitizer 4 agree with each other, as well as the standards of XY axis length agree with each other in 1:1. As a result, when the operator indicates points A and B on the digitizer 4 through the cursor device 6, a green straight line connecting two points A and B indicated is shown in real time and true size on the digitizer 4. Using the same procedure, red and blue and other colors straight lines, circles, and points can be drafted at the position indicated on the digitizer.

Data inputted into the control apparatus 52 is stored in a treatment device of the apparatus 52 before being outputted on a XY plotter. Drafting is done through the cursor device watching the right angle scale line 64 on the screen 16. The right angle scale line 64 corresponds to a right angle scale or a pair of straight rulers installed on a head of the universal parallelruler device, and the cursor device 6 corresponds to a writing instrument. The operator manipulates the cursor device 54 to carry out parallel movement and angle change of the right angle scale line 64 in a manner of the manipulation of the head of the universal parallel ruler device, and other cursor device 6 to draft a drawing. It is apparent from the above explanation that the cursor pattern generator 62 a means for displaying right angle scale lines on the screen of the display device, and the cursor parameter table 66, the changed length value-changed angle value translation means 60 and the cursor pattern generator 62 is a control means for moving in parallel and rotating the right angle scale line 64 on the screen 16. Although the scene of the display device is projected on the screen 16 through the enlarge projecting mechanism 50 according to the structure above, a display device having a display of the same size as the digitizer 4 may be arranged below the digitizer 4.

Next, a construction of the circle drawing means of in accordance with the present invention will be explained in detail with reference to FIGS. 1 to 4.

Figure 4:
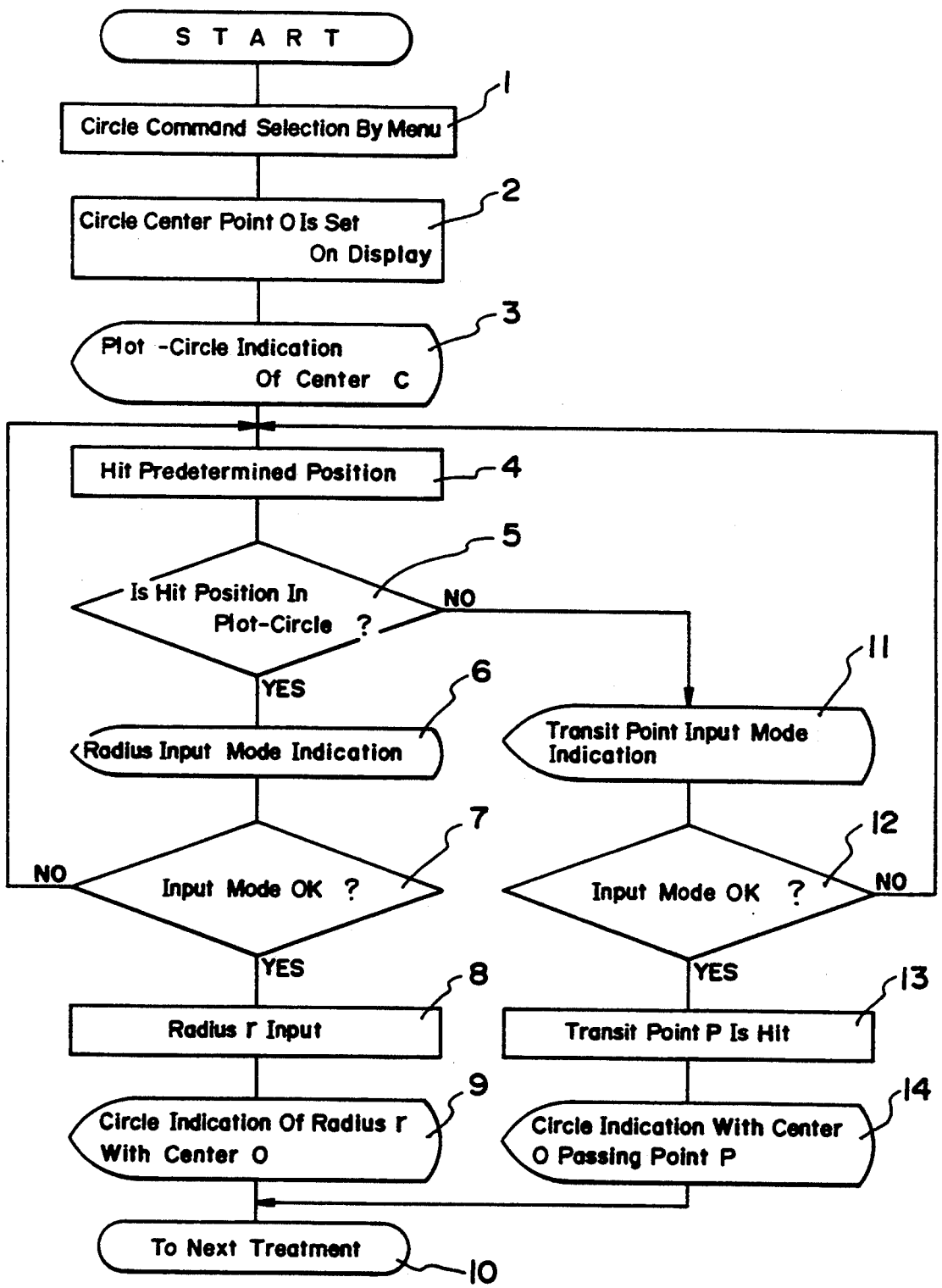
FIG. 4 is a flow chart of the operation.

The operator selects a circle command from the command menu displayed on the digitizer 4 by means of a cursor device 6 (step 1 as shown in FIG. 4). At step 4 of FIG. 4, the operator indicates any position on the digitizer by placing the cursor device 6 on the digitizer making the indication point a center point of the circle, thus a co-ordinates indication data is-input into a plot circle drawing means 80 through the digitizer 4.

Figure 1:
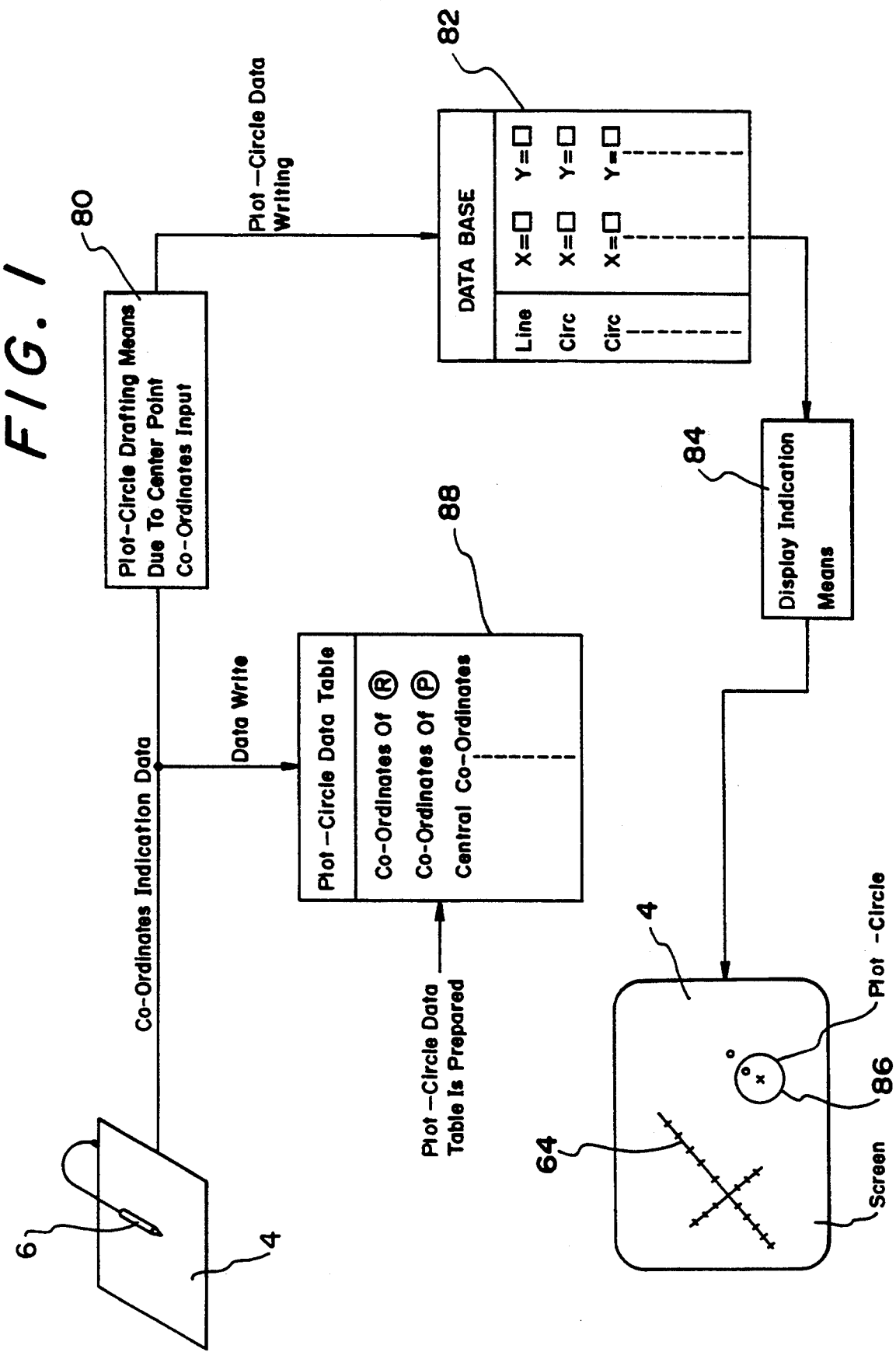
FIG. 1 is a block diagram of the input device according to the present invention.
Figure 2:
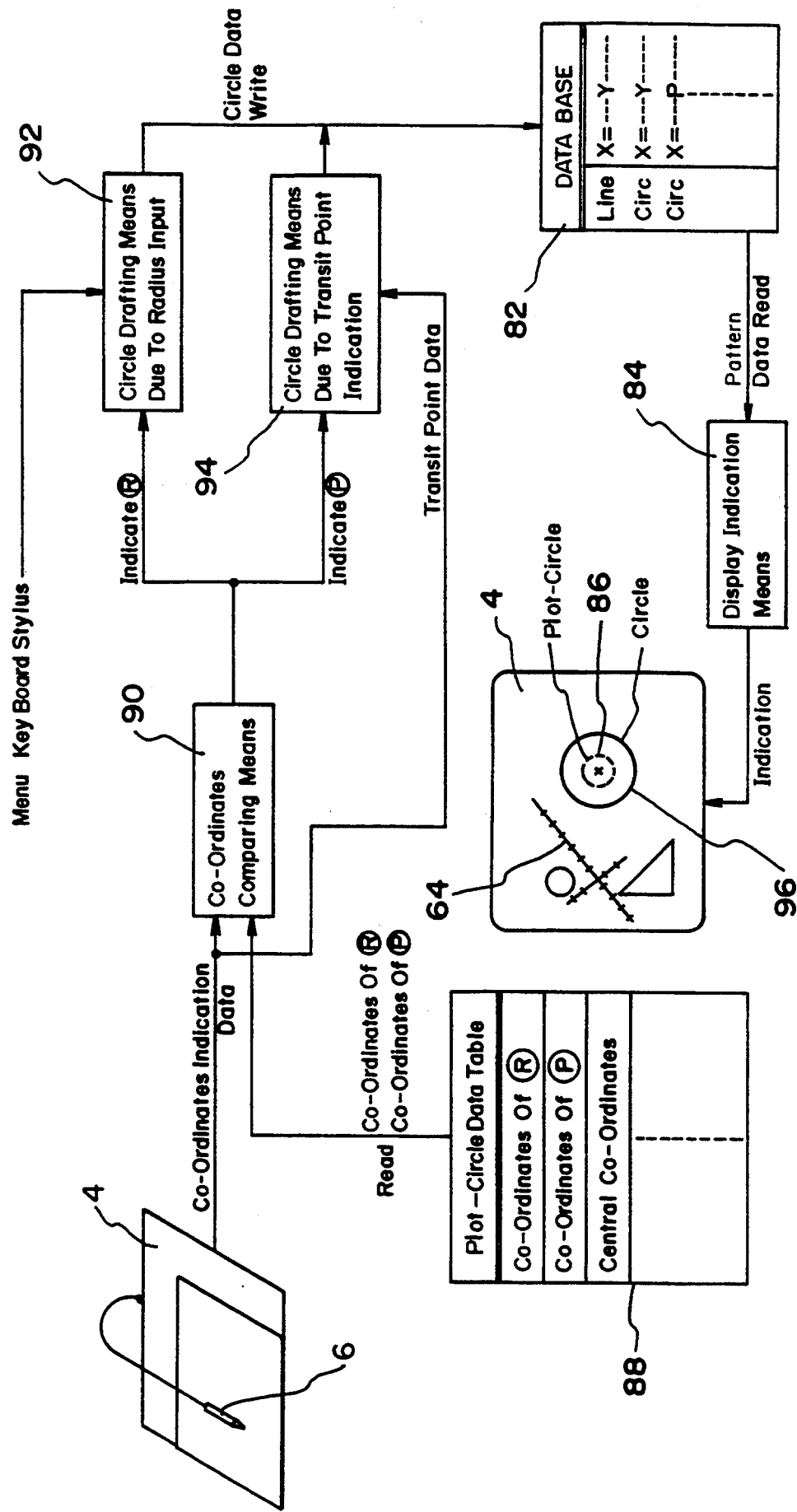
FIG. 2 is another block diagram similar to FIG. 1.
Figure 3:
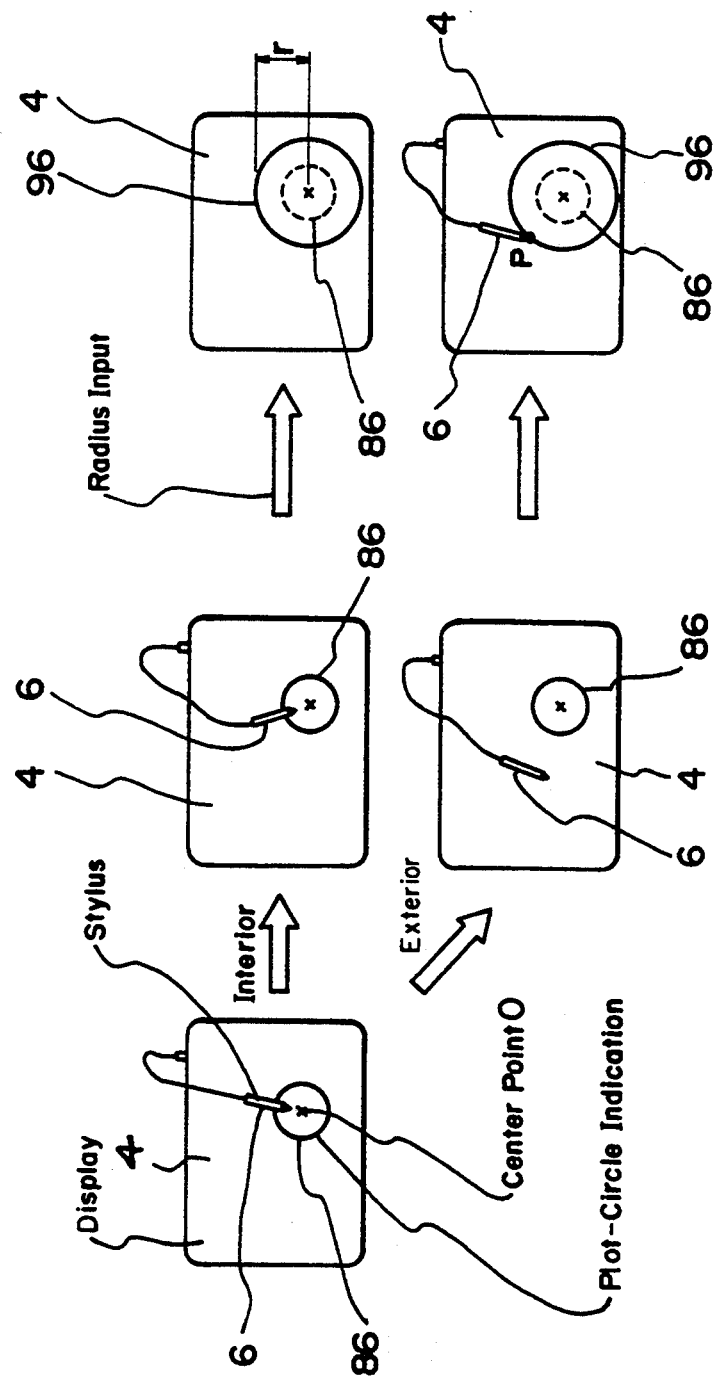
FIG. 3 is an explanation view of the operation of the input device.

The plot circle drawing means 80 is constructed so as to output, when the co-ordinates data is inputted, plot circle data having a center of the co-ordinates. When a co-ordinate of the center of the circle is inputted to the plot circle data drawing means 80, the plot circle data drawing means 80 outputs plot circle data into the data base 82, being written on the data base 82. The plot circle data written on the data base 82 is read-out from the data base 82, inputted to the display devices 22, 36, 42 (see FIG. 6), and displayed on the screen of the display device. Simultaneously, a plot circle 86 whose center corresponds to the point of the cursor device 6 is indicated on the screen 16 below the digitizer 4 through a projector 50. The scene indication means 84 is constructed with display devices 22, 36, 42, a display driver 17, the projector 50 and the screen 16. As shown in FIG. 1, when co-ordinates data of the center of the plot circle 86 is inputted from the digitizer 6 to a plot circle data table 88, the table 88 prepares data table of the plot circle 86. The data table 88 consists of various co-ordinates of R in the plot circle, P out of the plot circle, and the center of the plot circle. At the step 4 shown in FIG. 4, the operator uses the cursor device 4 to select the desired position on the digitizer 6. The hitting position on the digitizer 6 is set at an inner R of the plot circle 86 when a circle is drawn and a radius input system is used. When a passing point input system is employed, an outer P of the plot circle 86 is set. An operation to be carried out when an inner portion of the plot circle 86 is selected will be explained. To a co-ordinates comparison means 90 shown in FIG. 2, a co-ordinates indication data is inputted from the digitizer 6, and the co-ordinates values of the R of the plot circle 86 and of the P of the plot circle 86 are inputted after they are read from a plot circle data table 88. The co-ordinates comparison means 90 compares these co-ordinates, respectively inputted thereto in order to judge whether the selected position of the cursor device 4 is placed in the plot circle 86 or not (see the step 5 in FIG. 4). When the selected position of the cursor device 4 or the co-ordinates indication data from the digitizer 4 is placed in the plot circle 86, the co-ordinates comparison means 90 indicates a radius input mode display to the data base 82 at the step 6. Consequently, the radius input mode display data of the data base is read-out on the scene display means 84 and a radius input mode is indicated in the screen below the digitizer 4 (step 6). While, the co-ordinates comparison means 90 determines by calculation that the co-ordinates indication data is placed within the plot circle 86, thus a signal ordering to select a circle drawing means 92 owing to a radius input. Next, the CPU judges at the step 7 that an input mode is all right or not. When a yes is judged, it proceeds to the next step. The operator operates a key board or carries out an input operation of the command menu so as to input a radius r of the circle to be drawn into a drawing means 92 (see the step 8). When data of a radius r is inputted to the drawing means 92, the drawing means 92 outputs a circle data of the radius indicated as a center of the circle in order to write the circle data into the data base 82. The circle data written in the data base 82 is read-out from the data base 82 and is supplied to a scene indication means 84. At the step 9 shown in FIG. 4, a circle 96 having its center O and a radius r is displayed in the screen 16 below the digitizer 4. Next, the CPU transfers to its next treatment (step 10). When a passing point input system is to be employed, the operator selects the desired position outside of the plot circle 86 by the cursor device 4 at the step 4. When such hit co-ordinates indication data is inputted to the co-ordinates comparison means 90, the comparison means 90 compare the values of co-ordinates of R and P of the plot circles readout from the plot data table 88 and the co-ordinates data so as to judge the co-ordinates indication data hit through the cursor device 4 is placed within the plot circle or not (step 5 in FIG. 4). When the hit position by the cursor device or the co-ordinates indication data obtained from the output end of the digitizer 4 is placed out of the plot circle 86, the co-ordinates comparison means 90 indicates or orders the data base 82 to display a passing point input mode at the step 11. As a result, a passing point mode indication data in the data base is read-out on a scene display means 84 and a passing point input mode is displayed in the screen 16 below the digitizer 4. On other hand, the co-ordinates comparison means 90 outputs a selection signal of a circle drawing means 94 according to the passing point indication, the CPU judges whether an input mode is all right or not at the step 12. When it judges a yes, it proceeds to the next step. At the step, the operator hits a passing point P on the digitizer 4 means of the cursor device 4 (step 13). On the basis of a selection signal from the co-ordinates comparison means 90 and a passing point data indicated by the cursor device from the digitizer 6, the drawing means 94 outputs data of the circle 96 passing through the point P indicated by the passing data with its center of the center O of the plot circle 86 and the circle data is written in the data base 82. The circle data written in the data base 82 is read-out from the data base 82, it is supplied to the scene display means 84, and a circle 96 having its center O and passing through the point P is displayed in the screen below the digitizer 4 at the step 14 shown in FIG. 4.

As described above, according to the present invention, it is possible to select the changing-over of the input mode of a circle drafting with a plot circle having its center indicated or ordered being displayed in the scene, so that it is easy to visually operate it. Additionally, because the center point of the plot circle can be used as part of the input data as it is, the operability of the input device for CAD according to the present invention can be effectively improved.

What is claimed is:

1. A computer aided design apparatus in which an operator inputs data to the apparatus using various input devices for generating designs on a display device comprising:

plot circle drafting means for displaying a plot circle on the display at a position wherein the center of said plot circle corresponds to a first input data;

comparison means for comparing a second input data with coordinate data of said plot circle and for determining whether said second input data corresponds to a position within or out of said plot circle;

generating means, responsive to whether said second input data corresponds to a position within or out of said plot circle as determined by said comparison means for selecting one of at least two input devices, and for generating data representing a circle which is based on a third input data received from said selected one of the at least two input devices, wherein said generating means comprises: radius input circle drafting means for generating data representative of a circle whose center coincides with the center of the plot circle and radius corresponds to said third input data, when said second input data corresponds to a position within said plot circle; and circle drawing means for generating data representative of a circle whose center coincides with the center of the plot circle and whose perimeter passes through a point corresponding to said third input data, when said second input data corresponds to a position out of said plot circle.

2. The computer aided design apparatus as defined in claim 1, further comprising display means for displaying on said display device a circle at a position wherein the center of said circle corresponds to the center of said plot circle and the radius of said circle corresponds to said third input data.

3. The computer aided design apparatus as defined in claim 1, wherein said radius input circle drafting means receives said third input data through a keyboard and said circle drawing means receives said third input data through a digitizer and stylus pen or a mouse.

4. The computer aided design apparatus as defined in claim 1, wherein said first and second input data is inputted through a digitizer and stylus pen.

5. The computer aided design apparatus as defined in claim 1, further comprising a plot circle data table for storing coordinate data of said plot circle.

6. The computer aided design apparatus as defined in claim 1, further comprising a storage means for storing the generated design which is displayed on the display device.

7. A method of inputting data in a computer aided design apparatus of the type in which a digitizer is situated above a display device, the digitizer and the display device having a one to one relationship, wherein an operator inputs data to the apparatus through the digitizer and a cursor device and a keyboard for generating designs on a display device, said method comprising the steps of:

selecting from a command menu, using the cursor device, a circle command and drawing a plot circle on the display device at a position wherein the center of said plot circle corresponds to a first point selected by said cursor device;

selecting a second point with the cursor device which is within or out of said plot circle;

determining whether said second point selected is within or out of said plot circle;

generating, when the second point selected is within said plot circle, circle data whose center coincides with the center of said plot circle and radius corresponds to data inputted through the keyboard;

generating, when the second point selected is out of said plot circle, circle data whose center coincides with the center of said plot circle and perimeter passes through a third point selected by said cursor device; and displaying a circle on the display device corresponding to said generating circle data.

* * * * *